United States Patent
Gupta et al.

(10) Patent No.: US 10,999,715 B2
(45) Date of Patent: May 4, 2021

(54) MCPTT SYSTEM AND METHOD THEREOF FOR MANAGING MCPTT BROADCAST CALL IN OFF-NETWORK SYSTEM

(71) Applicant: Samsung Electronics Co., Ltd., Gyeonggi-do (KR)

(72) Inventors: Nishant Gupta, Bangalore (IN); Yun Sun Baek, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/448,892

(22) Filed: Jun. 21, 2019

(65) Prior Publication Data

US 2020/0137531 A1 Apr. 30, 2020

Related U.S. Application Data

(63) Continuation of application No. PCT/KR2018/012725, filed on Oct. 25, 2018.

(51) Int. Cl.
*H04W 4/10* (2009.01)
*H04W 76/38* (2018.01)
(Continued)

(52) U.S. Cl.
CPC ............. *H04W 4/10* (2013.01); *H04W 4/08* (2013.01); *H04W 76/11* (2018.02); *H04W 76/38* (2018.02)

(58) Field of Classification Search
CPC ....... H04W 4/10; H04W 76/38; H04W 76/11; H04W 4/08
See application file for complete search history.

(56) References Cited

U.S. PATENT DOCUMENTS 8,982,763 B2 * 3/2015 Ofir ...................... H04W 76/45
370/312
9,510,166 B1 * 11/2016 Allen ................... H04W 76/45
(Continued)

FOREIGN PATENT DOCUMENTS

KR 1020060013263 2/2006
KR 1020060015129 2/2006
(Continued)

OTHER PUBLICATIONS

The listed items were cited by the Korean Patent Office in a counterpart application, namely Appln. No. PCT/KR2018/012725. The International Search Report dated Jul. 12, 2019 is attached hereto.

(Continued)

*Primary Examiner* — Md K Talukder
(74) *Attorney, Agent, or Firm* — The Farrell Law Firm, P.C.

(57) ABSTRACT

Embodiments herein provide a method for managing Mission Critical Push To Talk (MCPTT) broadcast call between a first MCPTT client and a second MCPTT client in an off-network system. The method includes establishing, by the first MCPTT client, a broadcast call, where the first MCPTT client is transitioned from a first broadcast control state to a second broadcast control state after establishing the broadcast call. Further, the method includes releasing, by the first MCPTT client, the broadcast call, where the first MCPTT client is transitioned from the second broadcast control state to the first broadcast control state after releasing the broadcast call.

8 Claims, 13 Drawing Sheets

(51) Int. Cl.
H04W 76/11 (2018.01)
H04W 4/08 (2009.01)

(56) References Cited

U.S. PATENT DOCUMENTS

| | | | |
|---|---|---|---|
| 2003/0153340 A1* | 8/2003 | Crockett | H04M 7/006 |
| | | | 455/518 |
| 2017/0289776 A1 | 10/2017 | Kim et al. | |
| 2018/0041353 A1* | 2/2018 | Lefebre | H04L 12/185 |
| 2018/0249518 A1* | 8/2018 | Nguyen | H04W 4/10 |
| 2020/0137531 A1* | 4/2020 | Gupta | H04W 76/30 |

FOREIGN PATENT DOCUMENTS

| | | |
|---|---|---|
| KR | 1020100098753 | 9/2010 |
| WO | WO 2016/039579 | 3/2016 |

OTHER PUBLICATIONS

3GPP, 3rd Generation Partnership Project; Technical Specification Group Services and System Aspects; Mission Critical Push to Talk (MCPTT); Stage 1 (Release 16), 3GPP TS 22.179 V16.3.0, Sep. 2018, 87 pages.

International Search Report dated Jul. 12, 2019 issued in counterpart application No. PCT/KR2018/012725, 11 pages.

* cited by examiner

MCPTT SYSTEM AND METHOD THEREOF FOR MANAGING MCPTT BROADCAST CALL IN OFF-NETWORK SYSTEM

PRIORITY

This application is continuation of International Application No. PCT/KR2018/012725 filed on Oct. 25, 2018, the contents of which are incorporated herein by reference.

TECHNICAL FIELD

The embodiments herein generally relate to wireless communications systems. More particularly related to a MCPTT method and system for managing Mission Critical Push-To-Talk (MCPTT) broadcast call in an off-network system.

BACKGROUND

A Push too Talk service provides an arbitrated method by which two or more users may engage in a communication. The users request permission to transmit (e.g., traditionally by means of a press of a button). The Mission Critical Push to Talk over LTE (MCPTT) service supports an enhanced PTT service, suitable for mission critical scenarios, based upon 3GPP Evolved Packet System (EPS) services.

The MCPTT Service is intended to support communication between several users (a group call), where each of the user has the ability to gain access to the permission to talk in an arbitrated manner. However, the MCPTT Service also supports Private Calls between pairs of users. The MCPTT Service builds on the existing 3GPP transport communication mechanisms provided by the EPS architectures to establish, maintain, and terminate the actual communication path(s) among the users.

Further, the MCPTT Service also builds upon ProSe service enabler for off-network communications While operating in off-network mode the MCPTT service uses a ProSe E-UTRA direct (UE-to-UE) Communication path (ProSe direct communication path) for transport. The ProSe direct communication path does not traverse the network infrastructure.

In MCPTT off-network scenario, a user may request a broadcast call. The broadcast call is such that no response is expected from terminating end users. The caller initiates the broadcast call and transmits the media. Terminating end users receive the media but are not allowed to transmit. The broadcast call terminates once the caller ends the transmission or terminates the call. Terminating users may choose to join the broadcast call and are allowed to leave an in-progress broadcast call.

The principal object of the embodiments herein is to provide a MCPTT system and method thereof for MCPTT broadcast call in an off-network system.

Another object of the embodiments herein is to provide a MCPTT system and method thereof for establishing, by a first MCPTT client, a broadcast call, where the first MCPTT client is transitioned from a first broadcast control state to a second broadcast control state after establishing the broadcast call.

Another object of the embodiments herein is to provide a MCPTT system and method thereof for releasing, by the first MCPTT client, the broadcast call, where the first MCPTT client is transitioned from the second broadcast control state to the first broadcast control state after releasing the broadcast call.

Yet another object of the embodiments herein is to provide a MCPTT system and method thereof for establishing, by a second MCPTT client, the broadcast call with the first MCPTT client, where the second MCPTT client is transitioned from the first broadcast control state to the second broadcast control state after establishing the broadcast call with the first MCPTT client.

Yet another object of the embodiment herein is to provide a MCPTT system and method thereof for releasing, by the second MCPTT client, the broadcast call with the first MCPTT client, where the second MCPTT client is transitioned from the second broadcast control state to the first broadcast control state after releasing the broadcast call.

Yet another object of the embodiment herein is to provide a MCPTT system and method thereof for determining, by the second MCPTT client, that the second MCPTT client is in the first broadcast control state.

Yet another object of the embodiment herein is to provide a MCPTT system and method thereof for receiving, by the second MCPTT client, a group call broadcast message with a call identifier Information Element (IE) different to an in progress broadcast call from the first MCPTT client.

Yet another object of the embodiment herein is to provide a MCPTT system and method thereof for determining, by the second MCPTT client, that a second MCPTT user's acknowledgement is required.

Yet another object of the embodiment herein is to provide a mechanism for initiating, by the second MCPTT client, a waiting for user timer.

Yet another object of the embodiment herein is to provide a MCPTT system and method thereof for transitioning, by the second MCPTT client, from the first broadcast control state to a third broadcast control state.

SUMMARY

Accordingly the embodiments herein provide a method for managing MCPTT broadcast call between a first MCPTT client and a second MCPTT client in an off-network system. The method includes establishing, by the first MCPTT client, a broadcast call, where the first MCPTT client is transitioned from a first broadcast control state to a second broadcast control state after establishing the broadcast call. Further, the method includes releasing, by the first MCPTT client, the broadcast call, where the first MCPTT client is transitioned from the second broadcast control state to the first broadcast control state after releasing the broadcast call.

In an embodiment, establishing the broadcast call includes receiving an indication from a first MCPTT user to initiate the broadcast call. Further, the method includes generating a Session Descriptor (SDP) body. Further, the method includes storing the generated SDP body as a SDP body of the broadcast call. Further, the method includes generating a random number with a uniform distribution. Further, the method includes storing the generated random number as a call identifier of the broadcast call. Further, the method includes storing a first MCPTT user identifier as an originating MCPTT user identifier of the broadcast call. Further, the method includes storing the broadcast call as a call type. Further, the method includes generating a group call broadcast message. Further, the method includes notifying a floor participant of a bearer priority. Further, the method includes broadcasting the group call broadcast message. Further, the method includes establishing a media session based on the SDP body of the broadcast call. Further, the method includes triggering a broadcast retransmission timer. Further, the method includes transitioning by the first MCPTT user from the first broadcast control state to the second broadcast control state.

In an embodiment, in the group call broadcast message, the first MCPTT client sets the call identifier IE to a stored call identifier of the broadcast call, sets a call type IE to a stored broadcast call type, sets an originating MCPTT user identifier IE to a stored originating MCPTT user identifier of the broadcast call, sets a MCPTT group identifier IE to a stored MCPTT group identifier of the broadcast call, and sets a SDP IE to a stored SDP body of the broadcast call.

In an embodiment, releasing the broadcast call includes receiving an indication from a first MCPTT user to release the broadcast call. Further, the method includes releasing the established media session. Further, the method includes generating a group call broadcast end message. Further, the method includes broadcasting the group call broadcast end message. Further, the method includes terminating the broadcast retransmission timer. Further, the method includes transitioning by the first MCPTT client from the second broadcast control state to the first broadcast control state.

In an embodiment, in the group call broadcast end message, the first MCPTT client sets the call identifier IE to the stored call identifier of the broadcast call, sets the originating MCPTT user identifier IE to the stored originating MCPTT user identifier of the broadcast call, and sets the MCPTT group identifier IE to the stored MCPTT group identifier of the broadcast call.

Accordingly the embodiments herein provide a method for managing MCPTT broadcast call between a first MCPTT client and a second MCPTT client in an off-network system. The method includes receiving, by the second MCPTT client, a group call broadcast message broadcasted by the first MCPTT client. Further, the method includes establishing, by the second MCPTT client, a broadcast call with the first MCPTT client, where the second MCPTT client is transitioned from a first broadcast control state to a second broadcast control state after establishing the broadcast call with the first MCPTT client. Further, the method includes releasing, by the second MCPTT client, the broadcast call with the first MCPTT client, where the second MCPTT client is transitioned from the second broadcast control state to the first broadcast control state after releasing the broadcast call.

In an embodiment, establishing the broadcast call with the first MCPTT client includes storing a value of the call identifier IE of the group call broadcast message as a call identifier of the broadcast call. Further, the method includes storing a value of a call type IE of a group call broadcast message as a received broadcast call type. Further, the method includes storing a value of a SDP IE of the group call broadcast message as a SDP body of the broadcast call. Further, the method includes storing a value of an originating MCPTT user identifier IE of the group call broadcast message as an originating MCPTT user identifier of the broadcast call. Further, the method includes storing a value of a MCPTT group identifier IE of the group call broadcast message as a MCPTT group identifier of the broadcast call. Further, the method includes determining that the second MCPTT user acknowledgement is not required. Further, the method includes establishing a media session with the first MCPTT client based on the stored SDP body of the broadcast call. Further, the method includes transitioning by the second MCPTT client from the first broadcast control state to the second broadcast control state.

In an embodiment, establishing the broadcast call with the first MCPTT client including storing the value of the call identifier IE of the group call broadcast message as the call identifier of the broadcast call. Further, the method includes storing the value of the call type IE of the group call broadcast message as the received broadcast call type. Further, the method includes storing the value of the SDP IE of the group call broadcast message as the SDP body of the broadcast call. Further, the method includes storing the value of the originating MCPTT user identifier IE of the group call broadcast message as the originating MCPTT user identifier of the broadcast call. Further, the method includes storing the value of the MCPTT group identifier IE of the group call broadcast message as the MCPTT group identifier of the broadcast call. Further, the method includes determining that the second MCPTT user acknowledgement is required. Further, the method includes initiating a waiting for user timer. Further, the method includes transitioning by the second MCPTT client from the first broadcast control state to a third broadcast control state. Further, the method includes receiving an indication from the second MCPTT user to accept the broadcast call. Further, the method includes establishing a media session with the first MCPTT client based on the stored SDP body of the broadcast call. Further, the method includes transitioning by the second MCPTT client from the third broadcast control state to the second broadcast control state.

In an embodiment, releasing the broadcast call with the first MCPTT client includes receiving a group call broadcast end message including the call identifier IE same as the stored call identifier from the first MCPTT client. Further, the method includes releasing the broadcast call with the first MCPTT client. Further, the method includes transitioning by the second MCPTT client from the second broadcast control state to the first broadcast control state after releasing the broadcast call.

In an embodiment, releasing the broadcast call with the first MCPTT client includes receiving an indication from a second MCPTT user to release the broadcast call with the first MCPTT client. Further, the method includes transitioning by the second MCPTT client from the second broadcast control state to a fourth broadcast control state. Further, the method includes receiving a group call broadcast end message including the call identifier IE same as the stored call identifier from the first MCPTT client. Further, the method includes releasing the broadcast call with the first MCPTT client. Further, the method includes transitioning by the second MCPTT client from the fourth broadcast control state to the first broadcast control state after releasing the broadcast call.

Accordingly the embodiments herein provide a method for managing MCPTT broadcast call between a first MCPTT client and a second MCPTT client in an off-network system. The method includes receiving, by the second MCPTT client, a group call broadcast message with a call identifier IE different to an in progress broadcast call from a first MCPTT client. Further, the method includes determining, by the second MCPTT client, that a second MCPTT user acknowledgement is required. Further, the method includes initiating, by the second MCPTT client, a waiting for user timer. Further, the method includes transitioning, by the second MCPTT client, from the first broadcast control state to a third broadcast control state.

In an embodiment, determining that the second MCPTT user acknowledgement is required includes storing a value of the call identifier IE of the group call broadcast message as a call identifier of the broadcast call. Further, the method includes storing a value of a call type IE of a group call broadcast message as a received call type. Further, the method includes storing a value of a SDP IE of the group call broadcast message as a SDP body of the broadcast call. Further, the method includes storing a value of an originating MCPTT user identifier IE of the group call broadcast message as an originating MCPTT user identifier of the broadcast call. Further, the method includes storing a value of a MCPTT group identifier IE of the group call broadcast message as a MCPTT group identifier of the broadcast call. Further, the method includes determining that the second MCPTT user acknowledgement is required.

In an embodiment, the method includes receiving an indication from a second MCPTT user to reject the broadcast call. Further, the method includes terminating the waiting for user timer. Further, the method includes transitioning by the second MCPTT client from the third broadcast control state to a fourth broadcast control state. Further, the method includes receiving a group call broadcast end message comprising a call identifier IE same as a stored call identifier from the first MCPTT client. Further, the method includes transitioning by the second MCPTT client from the fourth broadcast control state to the first broadcast control state.

In an embodiment, the method includes determining that the waiting for user timer is expired. Further, the method includes transitioning by the second MCPTT client from the third broadcast control state to a fourth broadcast control state. Further, the method includes receiving a group call broadcast end message including a call identifier IE same as a stored call identifier from the first MCPTT client. Further, the method includes transitioning by the second MCPTT client from the fourth broadcast control state to the first broadcast control state.

Accordingly the embodiments herein provide a Mission Critical Push To Talk (MCPTT) system for managing MCPTT broadcast call in an off-network system, the MCPTT system includes a MCPTT client is configured to establish a broadcast call, wherein the MCPTT client is transitioned from a first broadcast control state to a second broadcast control state after establishing the broadcast call. Further, the MCPTT client is configured to release the broadcast call, wherein the MCPTT client is transitioned from the second broadcast control state to the first broadcast control state after releasing the broadcast call.

Accordingly the embodiments herein provide a Mission Critical Push To Talk (MCPTT) system for managing MCPTT broadcast call in an off-network system, the MCPTT system includes a MCPTT client configured to receive a group call broadcast message broadcasted by a UE. Further, the MCPTT client is configured to establish a broadcast call with the UE, wherein the MCPTT client is transitioned from a first broadcast control state to a second broadcast control state after establishing the broadcast call with the UE. Further, the MCPTT client is configured to release the broadcast call with the UE, wherein the MCPTT client is transitioned from the second broadcast control state to the first broadcast control state after releasing the broadcast call.

Accordingly the embodiments herein provide a Mission Critical Push To Talk (MCPTT) system for managing MCPTT broadcast call in an off-network system, the MCPTT system includes a MCPTT client is configured to receive a group call broadcast message broadcasted by a UE. Further, the MCPTT client is configured to determine that a MCPTT user acknowledgement is required. Further, the MCPTT client is configured to initiate a waiting for user timer. Further, the MCPTT client is configured to transition from the first broadcast control state to a third broadcast control state.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
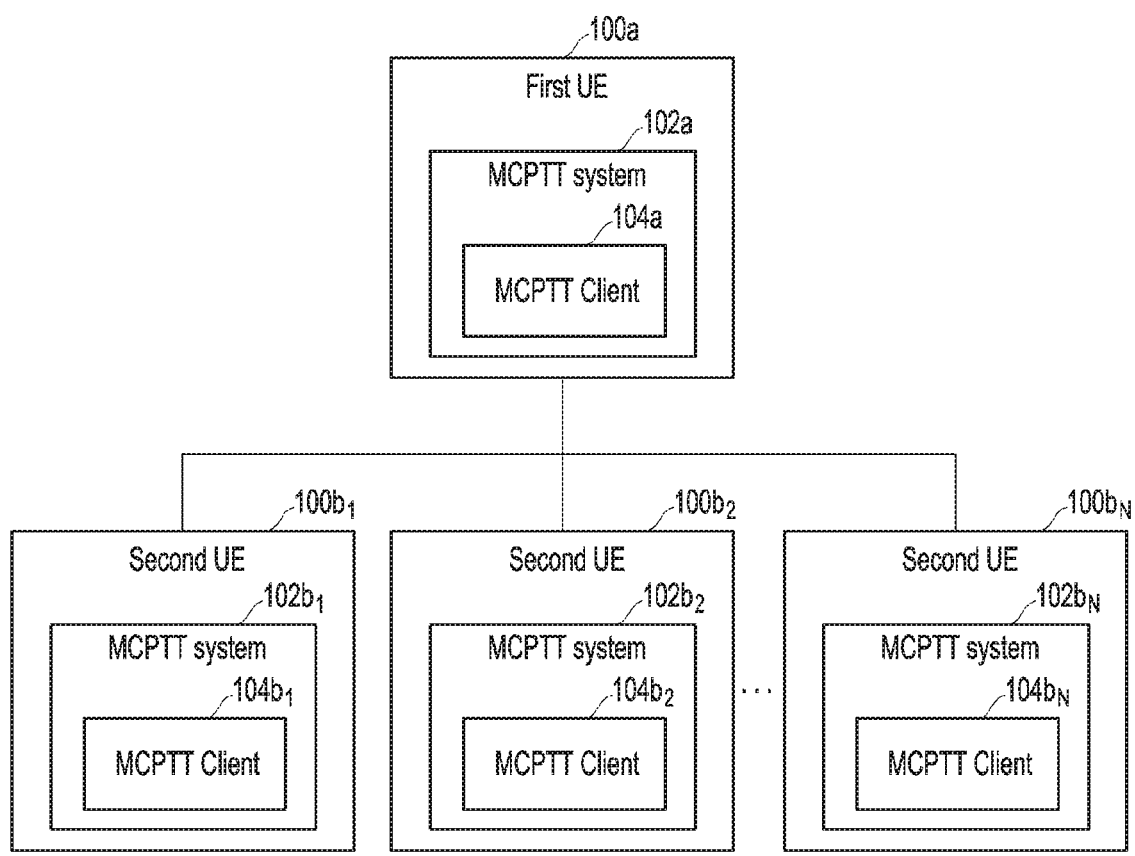
FIG. 1 illustrates a system for managing MCPTT broadcast call in an off-network system, according to an embodiment disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. The technology described herein is a part of the specification as described below:

Broadcast Group Call Control States:

1: B1: Start Stop

This state exists for a UE, when the UE is not part of an ongoing broadcast group call.

2: B2: In-Progress Broadcast Group Call

This state exists for the UE, when the UE is part of the ongoing broadcast group call.

3: B3: Pending User Action

This state exists for the UE; when the UE has presented a notification to a MCPTT user for a received GROUP CALL BROADCAST message, is waiting for a response from the MCPTT user.

4: B4: Ignoring Same Call ID

This state exists for the UE, when a group call was rejected or released and GROUP CALL BROADCAST message continue being received.

Procedures:

1: User Initiating a Broadcast Group Call

When in the "B1 start-stop" state, upon the indication from the MCPTT user to initiate the broadcast group call, a MCPTT client:

a. shall generate a SDP body and store it as the SDP body of the call;
  b. shall generate a random number with uniform distribution between 0 and 65535 and store it as a call identifier of the call;
  c. shall store own MCPTT user ID as an originating MCPTT user ID of the call;
  d. shall store 'BROADCAST GROUP CALL' as the current call type;
  e. shall generate a GROUP CALL BROADCAST message as specified in sub clause M1. In the GROUP CALL BROADCAST message, the MCPTT client:
    ① shall set a Call identifier IE to a stored call identifier of the call;
    ② shall set a Call type IE to a stored current call type;
    ③ shall set the Originating MCPTT user ID IE to a stored originating MCPTT user ID of the call;
    ④ shall set the MCPTT group ID IE to the stored MCPTT group ID of the call; and
    ⑤ shall set a SDP IE to a stored SDP body of the call;
  f. shall set a ProSe per-packet priority to a value corresponding to MCPTT off-network broadcast call;
  g. shall start floor control as originating floor participant;
  h. shall send the GROUP CALL BROADCAST message;
  i. shall establish a media session based on the stored SDP body of the call;
  j. shall start timer TFB2 (broadcast retransmission); and
  k. shall enter the 'B2: in-progress broadcast group call' state.

2: Terminating UE Receiving a GROUP CALL BROADCAST Message when not Participating in the in-Progress Broadcast Group Call When in the "B1: start-stop" state, upon receiving a GROUP CALL BROADCAST message with the Call identifier IE not matching any in-progress broadcast group call, the MCPTT client:

a. shall store the value of the Call identifier IE of the GROUP CALL BROADCAST message as the call identifier of the call;
  b. shall store the value of the Call type IE of the GROUP CALL BROADCAST message as the received current call type;
  c. shall store the value of the SDP IE of the GROUP CALL BROADCAST message as the SDP body;
  d. shall store the value of the Originating MCPTT user ID IE of the GROUP CALL BROADCAST message as the originating MCPTT user ID of the call;
  e. shall store the value of the MCPTT group ID IE of the GROUP CALL BROADCAST message as the MCPTT group ID of the call;
  f. if the terminating UE is configured that the terminating MCPTT user acknowledgement is required upon a terminating call request reception:
    ① shall start timer TFB3 (waiting for user); and
    ② shall enter the "B3: pending user action" state.
  g. if the terminating UE is configured that the terminating MCPTT user acknowledgement is not required upon a terminating call request reception:
    ① shall establish a media session based on the stored SDP body of the call;
    ② shall start floor control as terminating floor participant;
    ③ shall start timer TFB1 (max duration); and
    ④ shall enter the "B2: in-progress broadcast group call" state.

3: MCPTT User Accepts the Terminating Call

When in the "B3: pending user action" state, upon indication from the MCPTT user to accept the incoming broadcast group call, the MCPTT client:

a. shall establish a media session based on the stored SDP body of the call;
  b. shall start floor control as terminating floor participant;
  c. shall stop timer TFB3 (waiting for the user);
  d. shall start timer TFB1 (max duration); and
  e. shall enter the "B2: in-progress broadcast group call" state.

4: MCPTT User Rejects the Terminating Call

When in the "B3: pending user action" state, upon an indication from the MCPTT user to reject the incoming broadcast group call, the MCPTT client:

a. shall stop timer TFB3 (waiting for user); and
  b. shall enter the "B4: ignoring same call ID" state.

5: MCPTT User does not Act on Terminating Call

When in the "B3: pending user action" state, upon expiration of timer TFB3 (waiting for user), the MCPTT client:

a. shall enter the "B4: ignoring same call ID" state.

6: Terminating User Releasing the Call

When in the "B2: in-progress broadcast group call" state, upon an indication from the terminating MCPTT user to release the in-progress broadcast group call, the MCPTT client:

a. shall release the media session;
  b. shall stop floor control; and
  c. shall enter the "B4: ignoring same call ID" state.

7: Originating User Releasing the Call

When in the "B2: in-progress broadcast group call" state, upon an indication from the originating MCPTT user to release the in-progress broadcast group call, the MCPTT client:

110a. shall release the media session;
  b. shall generate a GROUP CALL BROADCAST END message as specified in subclause M2. In the GROUP CALL BROADCAST END message, the MCPTT client:
    ① shall set the Call identifier IE to the stored call identifier of the call;
    ② shall set the Originating MCPTT user ID IE to the stored originating MCPTT user ID of the call; and
    ③ shall set the MCPTT group ID IE to the stored MCPTT group ID of the call;
  c. shall send the GROUP CALL BROADCAST END message;
  d. shall stop timer TFB2 (broadcast retransmission);
  e. shall stop floor control; and
  f. shall enter the "B1: start-stop" state.

8: Receiving GROUP CALL BROADCAST END Message

When in the "B2: in-progress broadcast group call" state or "B4: ignoring same call ID" state, upon receiving GROUP CALL BROADCAST END message with the same Call identifier IE as the stored call identifier, the MCPTT client:

a. shall release media session;
  b. shall stop floor control, if running; and
  c. shall enter the "B1: start-stop" state.

8: Receiving GROUP CALL BROADCAST END Message

When in the "B2: in-progress broadcast group call" state or "B4: ignoring same call ID" state, upon receiving GROUP CALL BROADCAST END message with the same Call identifier IE as the stored call identifier, the MCPTT client:

a. shall release media session;
  b. shall stop floor control, if running; and
  c. shall enter the "B1: start-stop" state.

9: Originating UE Retransmitting GROUP CALL BROADCAST Message

When in the "B2: in-progress broadcast group call" state, upon expiry of timer TFB2 (broadcast retransmission), the MCPTT a. shall generate a GROUP CALL BROADCAST message as specified in subclause M1. In the GROUP CALL BROADCAST message, the MCPTT client:
    ① shall set the Call identifier IE to the stored call identifier of the call;
    ② shall set the Call type IE to the stored current call type;
    ③ shall set the Originating MCPTT user ID IE to the stored originating MCPTT user ID of the call;
    ④ shall set the MCPTT group ID IE to the stored MCPTT group ID of the call; and
    ⑤ shall set the SDP IE to the stored SDP body of the call;
  b. shall send the GROUP CALL BROADCAST message;
  c. shall restart timer TFB2 (broadcast retransmission); and
  d. shall remain in the "B2: in-progress broadcast group call" state.

10: Ignoring Same Call ID

When in the "B4: ignoring same call ID" state, upon receiving GROUP CALL BROADCAST message and if the call identifier in GROUP CALL BROADCAST message matches with the stored call identifier the MCPTT client:

a. shall restart timer TFB1 (max duration); and
  b. shall remain in "B4: ignoring same call ID" state.

11: Releasing the Call

When in the "B2: in-progress broadcast group call" state or "B4: ignoring same call ID" state, upon expiry of timer TFB1 (max duration) the MCPTT client:

a. shall release the media session;
  b. shall clear the stored call identifier;
  c. shall stop floor control, if running; and
  d. shall enter the "B 1: start-stop" state.

Messages:

M1: GROUP CALL BROADCAST Message

Message Definition

This message is sent by the UE to other UEs to announce broadcast group call to other UEs. For contents of the message see Table M1-1.

① Message type: GROUP CALL BROADCAST
  ② Direction: UE to other UEs

TABLE 1

| Information Element | Presence | Format | Length |
|---|---|---|---|
| Group call broadcast message identity | Mandatory | V | 1 |
| Call identifier | Mandatory | V | 2 |
| Call type | Mandatory | V | 1 |
| Originating MCPTT user ID | Mandatory | LV-E | 3-x |
| MCPTT group ID | Mandatory | LV-E | 3-x |
| SDP | Mandatory | LV-E | 3-x |

M2: GROUP CALL BROADCAST END Message

Message Definition

This message is sent by the UE to other UEs to indicate termination of a broadcast group call. For contents of the message see Table M2-1.

① Message type: GROUP CALL BROADCAST END
  ② Direction: UE to other UEs

TABLE 2

| Information Element | Presence | Format | Length |
|---|---|---|---|
| Group call broadcast end message identity | Mandatory | V | 1 |
| Call identifier | Mandatory | V | 2 |
| MCPTT group ID | Mandatory | LV-E | 3-x |
| Originating MCPTT user ID | Mandatory | LV-E | 3-x |

The embodiments herein disclose a method for managing MCPTT broadcast call in an off-network system. The method includes establishing a broadcast call, where the first MCPTT client is transitioned from a first broadcast control state to a second broadcast control state after establishing the broadcast call. Further, the method includes releasing, by the first MCPTT client, the broadcast call, where the first MCPTT client is transitioned from the second broadcast control state to the first broadcast control state after releasing the broadcast call.

Another embodiment herein discloses a method for managing MCPTT broadcast call in the off-network system. The method includes establishing the broadcast call with the first MCPTT client, where the second MCPTT client is transitioned from the first broadcast control state to the second broadcast control state after establishing the broadcast call with the first MCPTT client. Further, the method includes releasing the broadcast call with the first MCPTT client, where the second MCPTT client is transitioned from the second broadcast control state to the first broadcast control state after releasing the broadcast call.

Another embodiment herein discloses a method for managing MCPTT broadcast call in the off-network system. The method includes determining that the second MCPTT client is in the first broadcast control state. Further, the method includes receiving the group call broadcast message with the call identifier IE different to the in progress broadcast call from the first MCPTT client. Further, the method includes determining that the second MCPTT user acknowledgement is required. Further, the method includes initiating the waiting for user time. Further, the method includes transitioning from the first broadcast control state to the third broadcast control state.

Unlike conventional systems and methods, the proposed method provides a robust and simple mechanism for establishing the MCPTT off-network broadcast call between the first MCPTT client and the at least one second MCPTT client. Further, the proposed mechanism provides a state machine for the first MCPTT client and the at least one second MCPTT client involved in the broadcast call. Further, the proposed mechanism provides messages and their formats used in the broadcast call.

Referring now to the drawings, and more particularly to FIGS. 1 through 7, where similar reference characters denote corresponding features consistently throughout the figures, there are shown preferred embodiments.

FIG. 1 illustrates an off-network system for managing MCPTT broadcast call, according to an embodiment disclosed herein. In an embodiment, the off-network system includes a first User Equipment (UE) 100a and a plurality of second UEs 100b$_{1-N}$ (hereafter referred as the second MCPTT client(s) 100b). The first UE 100a includes a first MCPTT system 102a. The first MCPTT system 102a includes a first MCPTT client 104a. The second UE 100b includes a second MCPTT system 102b. The second MCPTT system 102b includes a second MCPTT client 104b. The first UE 100a and the second UE 100b can be, for example, a laptop, a desktop computer, a mobile phone, a mobile terminal, a mobile station, a smart phone, Personal Digital Assistants (PDAs), a tablet, a phablet, a consumer electronic device, dual display devices, or any other electronic device.

In an embodiment, the first MCPTT client 104a can be configured to establish the broadcast call with the second MCPTT client 104b, where the first MCPTT client 104a is transitioned from a first broadcast control state to a second broadcast control state after establishing the broadcast call with the second MCPTT client 104b. In an embodiment, the first broadcast control state is a "START-STOP" state. In an embodiment, the second broadcast control state is an "IN-PROGRESS BROADCAST GROUP CALL". Further, the first MCPTT client 104a can be configured to release the broadcast call with the second MCPTT client 104b, where the first MCPTT client 104a is transitioned from the second broadcast control state to the first broadcast control state after releasing the broadcast call. Further, the additional functionalities of the first MCPTT client 104a are explained in conjunction with FIGS. 2A-2B and FIGS. 4A-4D.

In an embodiment, the second MCPTT client 104b can be configured to establish the broadcast call with the first MCPTT client 104a, where the second MCPTT client 104b is transitioned from the first broadcast control state to the second broadcast control state after establishing the broadcast call with the first MCPTT client 104a. Further, the second MCPTT client 104b can be configured to release the broadcast call with the first MCPTT client 104a, where the second MCPTT client 104b is transitioned from the second broadcast control state to the first broadcast control state after releasing the broadcast call. Further, the additional functionalities of the second MCPTT client 104b are explained in conjunction with FIGS. 3A-3E and FIGS. 4A-4D.

FIG. 1 shows exemplary off-network system but it is to be understood that other embodiments are not limited thereon. In other embodiments, the off-network system may include less or more number of units. Further, the labels or names of the units are used only for illustrative purpose and does not limit the scope of the invention. One or more units can be combined together to perform same or substantially similar function in the off-network system.

Figure 2A:
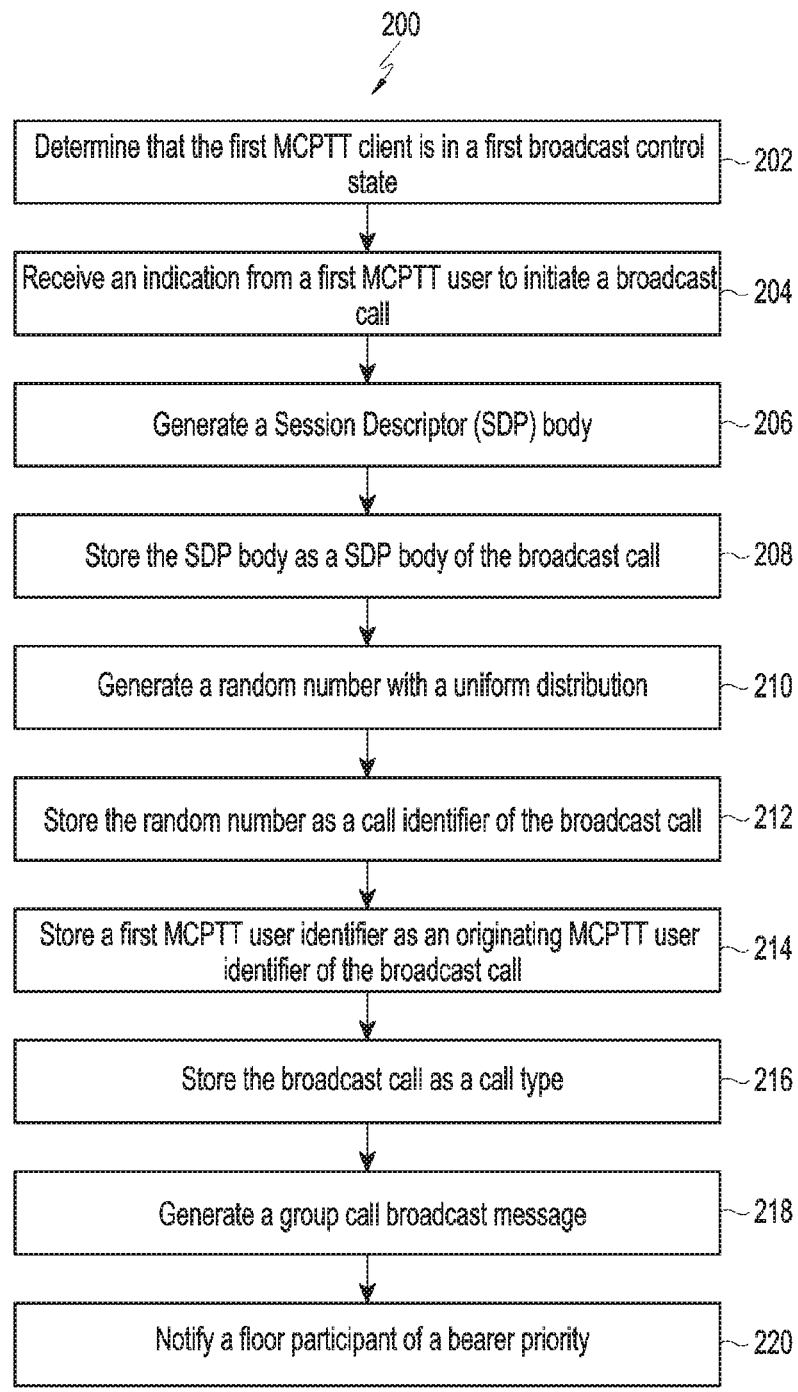
FIGS. 2A-2B are a flow diagram illustrating a method for managing MCPTT broadcast call in an off-network system, according to an embodiment as disclosed, herein.
Figure 2B:
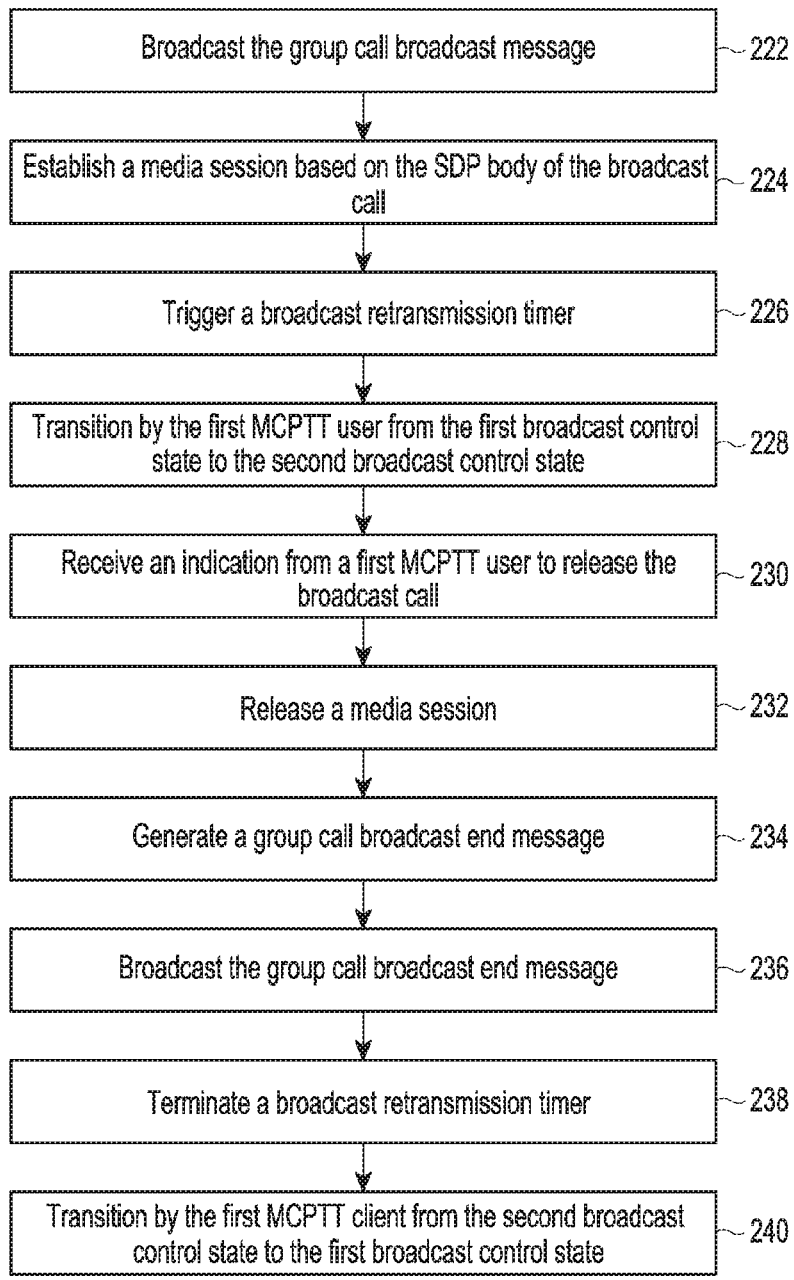
Figure 3A:
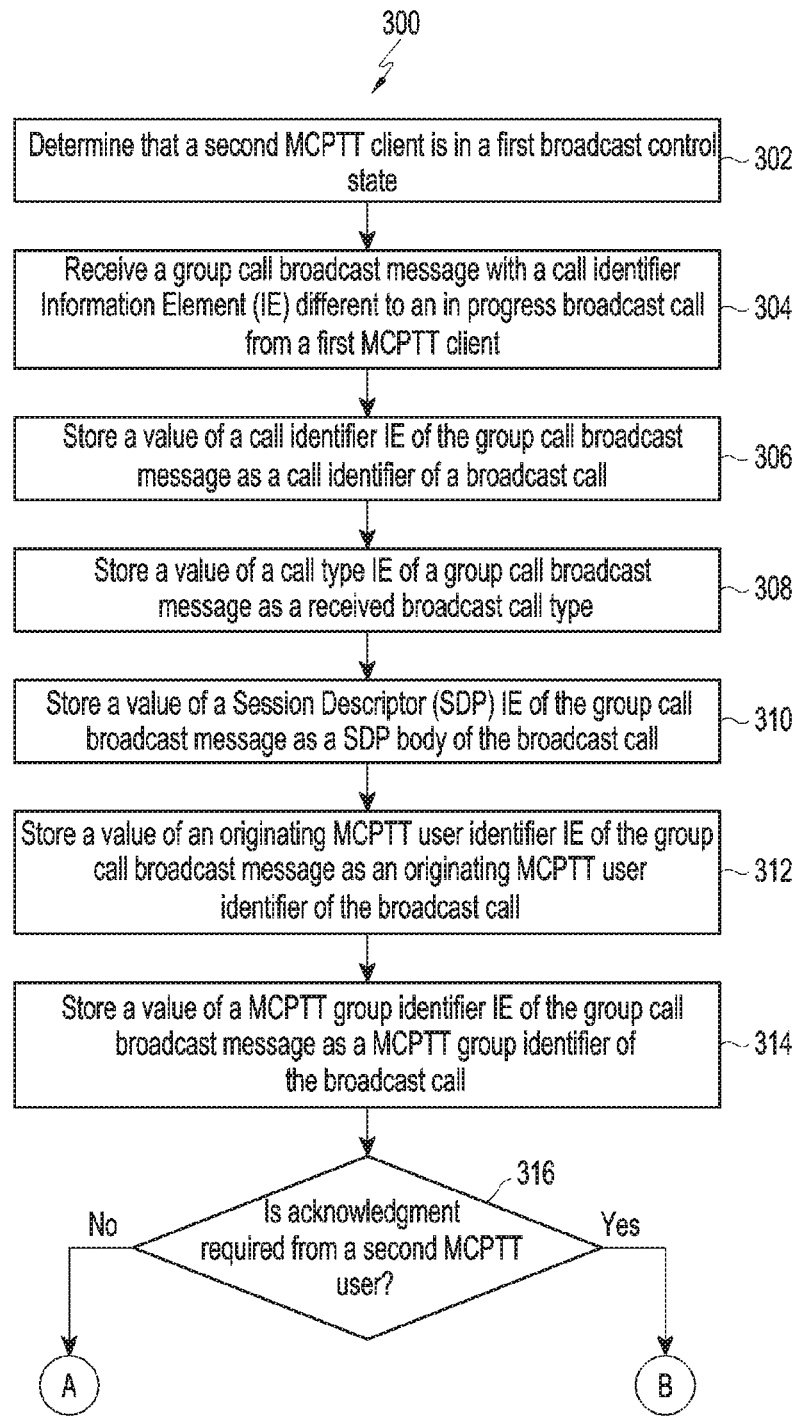
FIGS. 3A-3E are another flow diagram illustrating a method for managing MCPTT broadcast call in an off-network system, according to an embodiment as disclosed herein.
Figure 3B:
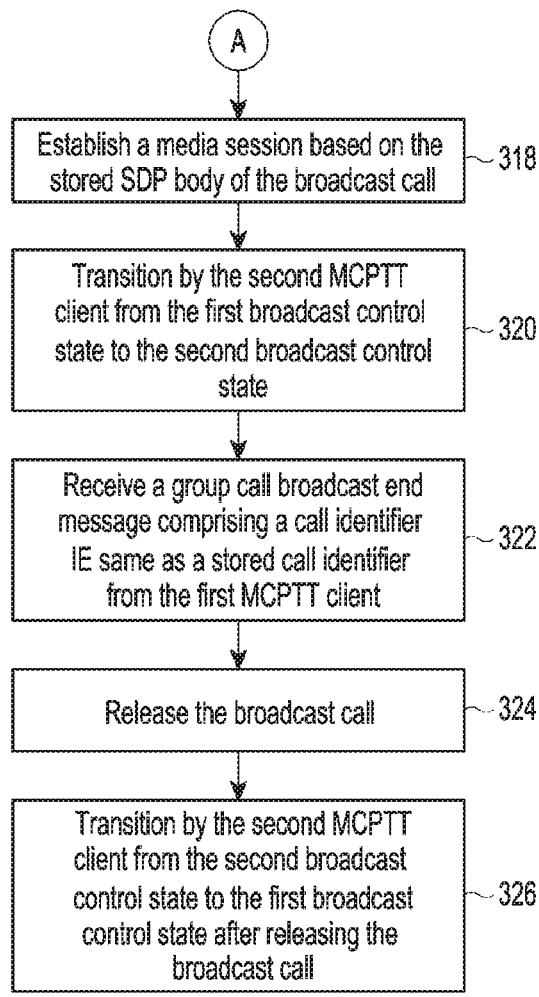
Figure 3C:
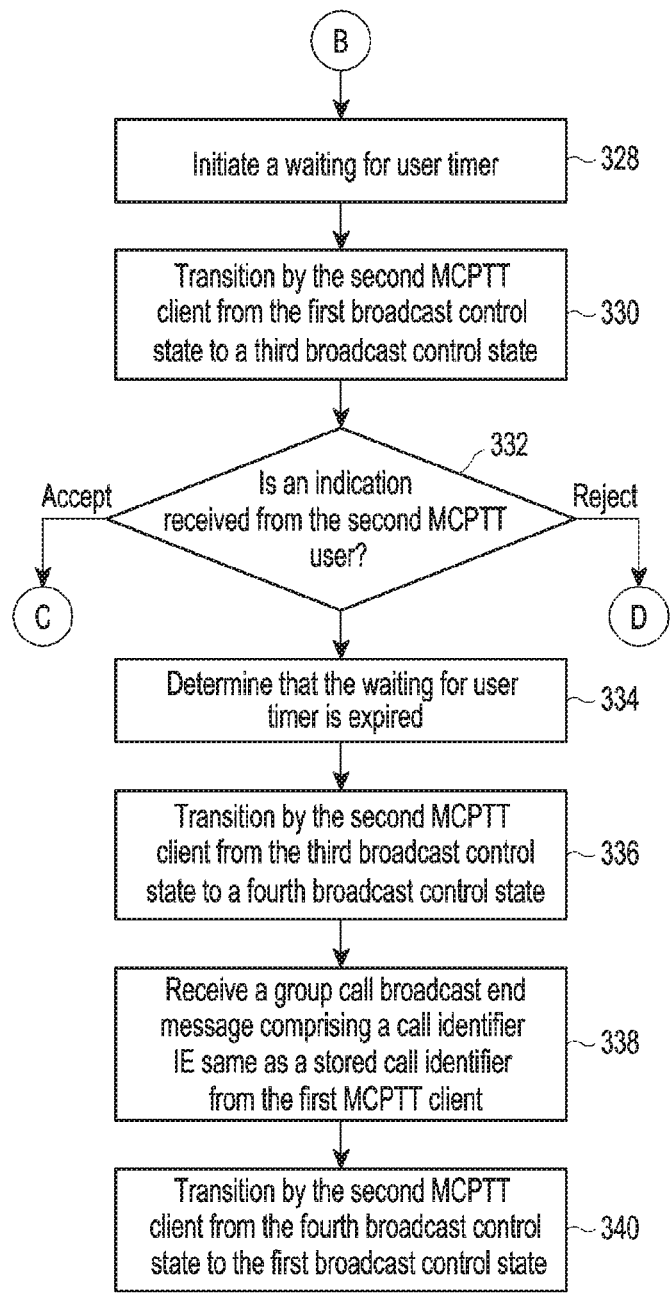
Figure 3D:
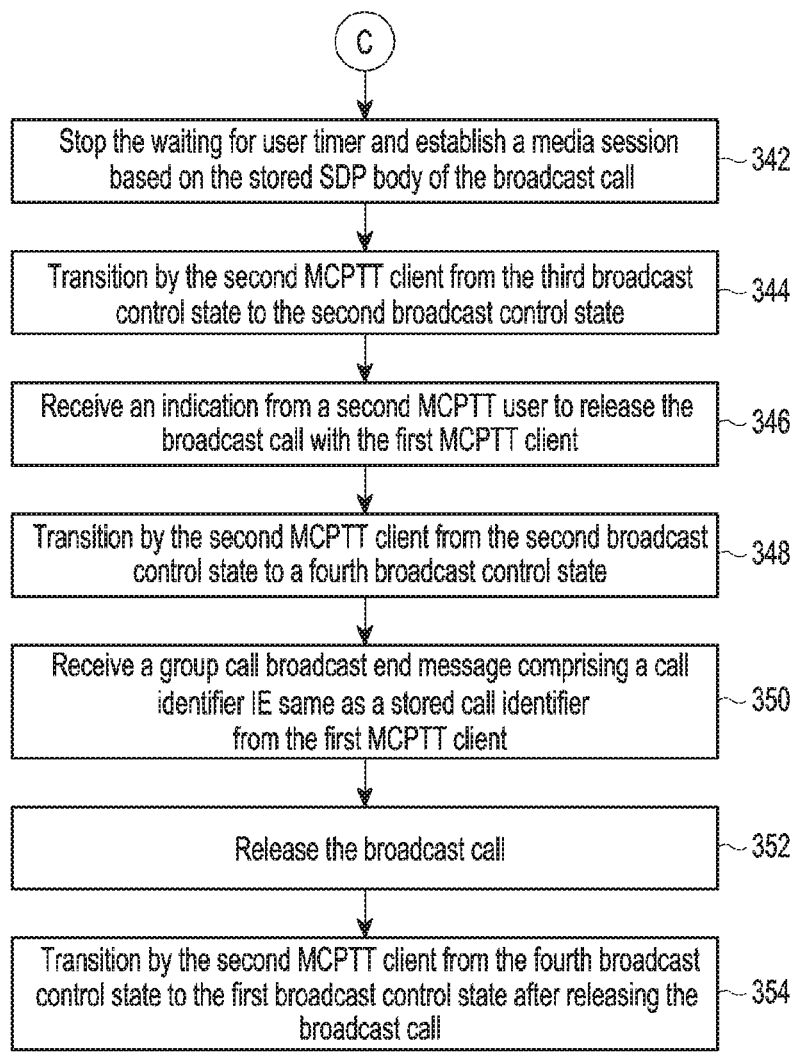
Figure 3E:
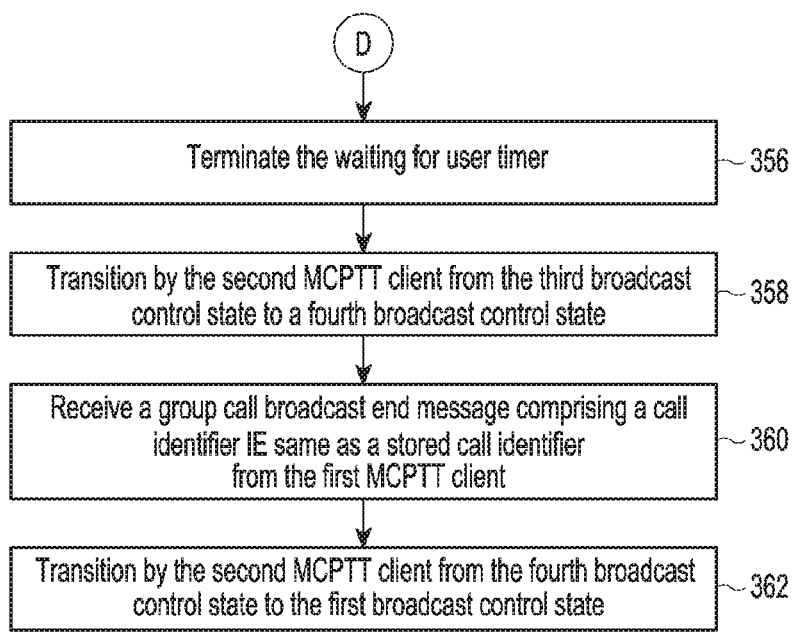

FIGS. 2A-2B are a flow chart 200 illustrating a method for managing the MCPTT broadcast call in the off-network system, according to an embodiment as disclosed herein. At step 202, the method includes determining that the first MCPTT client 104a is in the first broadcast control state. The method allows the first MCPTT client 104a to determine that the first MCPTT client 104a is in the first broadcast control state. At step 204, the method includes receiving an indication from a first MCPTT user to initiate the broadcast call with the second MCPTT client 104b. The method allows the first MCPTT client 104a to receive the indication from the first MCPTT user to initiate the broadcast call with the second MCPTT client 104b.

At step 206, the method includes generating a SDP body. The method allows the first MCPTT client 104a to generate the SDP body. At step 208, the method includes storing the SDP body as a SDP body of the broadcast call. The method allows the first MCPTT client 104a to store the SDP body as the SDP body of the broadcast call. At step 210, the method includes generating a random number with a uniform distribution. The method allows the first MCPTT client 104a to generate the random number with the uniform distribution. At step 212, the method includes storing the random number as a call identifier of the broadcast call. The method allows the first MCPTT client 104a to store the random number as the call identifier of the broadcast call. At step 214, the method includes storing the first MCPTT user identifier as an originating MCPTT user identifier of the broadcast call. The method allows the first MCPTT client 104a to store the first MCPTT user identifier as the originating MCPTT user identifier of the broadcast call.

At step 216, the method includes storing the broadcast call as a call type. The method allows the first MCPTT client 104a to store the broadcast call as the call type. At step 218, the method includes generating the group call broadcast message. The method allows the first MCPTT client 104a to generate the group call broadcast message. In an embodiment, in the group call broadcast message, the first MCPTT client 104a sets the call identifier IE to a stored call identifier of the broadcast call, sets a call type IE to a stored broadcast call type, sets an originating MCPTT user identifier IE to a stored originating MCPTT user identifier of the broadcast call, sets a MCPTT group identifier IE to a stored MCPTT group identifier of the broadcast call, and sets a SDP IE to a stored SDP body of the broadcast call. In an embodiment, the group call broadcast message format is shown below:

Message definition: The group call broadcast message is sent by the first UE 100a to the second UE 100b for announcing the broadcast call to the second UE 100b. The contents of the group call broadcast message are shown below in Table 3:

Message type: GROUP CALL BROADCAST
Direction: the First UE 100a to the second UE 100b

TABLE 3

| Information Element | Presence | Format | Length |
|---|---|---|---|
| Group call broadcast message identity | Mandatory | V | 1 |
| Call identifier | Mandatory | V | 2 |
| Call Type | Mandatory | V | 1 |
| Originating MCPTT user ID | Mandatory | LV-E | 3-x |
| MCPTT Group ID | Mandatory | LV-E | 3-x |
| SDP | Mandatory | LV-E | 3-x |

At step 220, the method includes notifying a floor participant of a bearer priority. The method allows the first MCPTT client 104a to notify the floor participant of the bearer priority. At step 222, the method includes broadcasting the group call broadcast message to the second MCPTT client 104b. The method allows the first MCPTT client 104a to send the group call broadcast message to the second MCPTT client 104b. At step 224, the method includes establishing the media session with the second MCPTT client 104b based on the SDP body of the broadcast call. The method allows the first MCPTT client 104a to establish the media session with the second MCPTT client 104b based on the SDP body of the broadcast call.

At step 226, the method includes triggering a broadcast retransmission timer. The method allows the first MCPTT client 104a to trigger the broadcast retransmission timer. At step 228, the method includes transitioning by the first MCPTT client 104a from the first broadcast control state to the second broadcast control state. The method allows the first MCPTT client 104a to transition from the first broadcast control state to the second broadcast control state. At step 230, the method includes receiving an indication from the first MCPTT user to release the broadcast call. The method allows the first MCPTT client 104a to receive the indication from the first MCPTT user to release the broadcast call.

At step 232, the method includes releasing the media session established with the second MCPTT client 104b. The method allows the first MCPTT client 104a to release the media session established with the second MCPTT client 104b. At step 234, the method includes generating a group call broadcast end message. The method allows the first MCPTT client 104a to generate the group call broadcast end message. In an embodiment, in the group call broadcast end message, the first MCPTT client 104a sets the call identifier IE to the stored call identifier of the broadcast call, sets the originating MCPTT user identifier IE to the stored originating MCPTT user identifier of the broadcast call, and sets the MCPTT group identifier IE to the stored MCPTT group identifier of the broadcast call. In an embodiment, the group call broadcast end message format is shown below:

Message definition: The group call broadcast end message is sent by the first UE 100a to the second UE 100b to indicate termination of the broadcast call. The contents of the message are shown below in Table 4:

Message type: GROUP CALL BROADCAST END
Direction: the first UE 100a to the second UE 100b

TABLE 4

| Information Element | Presence | Format | Length |
|---|---|---|---|
| Group call broadcast end message identity | Mandatory | V | 1 |
| Call identifier | Mandatory | V | 2 |
| MCPTT Group ID | Mandatory | LV-E | 3-x |
| Originating MCPTT user ID | Mandatory | LVE | 3-x |

At step 236, the method includes broadcasting the group call broadcast end message to the second MCPTT client 104b. The method allows the first MCPTT client 104a to send the group call broadcast end message to the second MCPTT client 104b. At step 238, the method includes terminating the broadcast retransmission timer. The method allows the first MCPTT client 104a to terminate the broadcast retransmission timer. At step 240, the method includes transitioning by the first MCPTT client 104a from the second broadcast control state to the first broadcast control state. The method allows the first MCPTT client 104a to transition from the second broadcast control state to the first broadcast control state.

The various actions, acts, blocks, steps, or the like in the flow chart 200 may be performed in the order presented, in a different order or simultaneously. Further, in some embodiments, some of the actions, acts, blocks, steps, or the like may be omitted, added, modified, skipped, or the like without departing from the scope of the invention.

FIGS. 3A-3E are a flow chart 300 illustrating a method for managing the MCPTT broadcast call in the off-network system, according to an embodiment as disclosed herein. At step 302, the method includes determining that the second MCPTT client 104b is in the first broadcast control state. The method allows the second MCPTT client 104b to determine that the second MCPTT client 104b is in the first broadcast control state. At step 304, the method includes receiving the group call broadcast message with the call identifier IE different to the in progress broadcast call from the first MCPTT client 104a. The method allows the second MCPTT client 104b to receive the group call broadcast message with the call identifier IE different to the in progress broadcast call from the first MCPTT client 104a.

At step 306, the method includes storing the value of the call identifier IE of the group call broadcast message as the call identifier of the broadcast call. The method allows the second MCPTT client 104b to store the value of the call identifier IE of the group call broadcast message as the call identifier of the broadcast call. At step 308, the method includes storing the value of the call type IE of the group call broadcast message as the received broadcast call type. The method allows the second MCPTT client 104b to store the value of the call type IE of the group call broadcast message as the received broadcast call type. At step 310, the method includes storing the value of the SDP IE of the group call broadcast message as the SDP body of the broadcast call. The method allows the second MCPTT client 104b to store the value of the SDP IE of the group call broadcast message as the SDP body of the broadcast call.

At step 312, the method includes storing the value of the originating MCPTT user identifier IE of the group call broadcast message as the originating MCPTT user identifier of the broadcast call. The method allows the second MCPTT client 104b to store the value of the originating MCPTT user identifier IE of the group call broadcast message as the originating MCPTT user identifier of the broadcast call. At step 314, the method includes storing the value of the MCPTT group identifier IE of the group call broadcast message as the MCPTT group identifier of the broadcast call. The method allows the second MCPTT client 104b to store the value of the MCPTT group identifier IE of the group call broadcast message as the MCPTT group identifier of the broadcast call.

At step 316, if it is determined that the acknowledgement is not required from a second MCPTT user then, at step 318, the method includes establishing the media session with the first MCPTT client 104a based on the stored SDP body of the broadcast call. The method allows the second MCPTT client 104b to establish the media session with the first MCPTT client 104a based on the stored SDP body of the broadcast call. At step 320, the method includes transitioning by the second MCPTT client 104b from the first broadcast control state to the second broadcast control state. The method allows the second MCPTT client 104b to transition from the first broadcast control state to the second broadcast control state.

At step 322, the method includes receiving the group call broadcast end message including the call identifier IE same as the stored call identifier from the first MCPTT client 104a. The method allows the second MCPTT client 104b to receive the group call broadcast end message including the call identifier IE same as the stored call identifier from the first MCPTT client 104a. At step 324, the method includes releasing the broadcast call with the first MCPTT client 104a. The method allows the second MCPTT client 104b to release the broadcast call with the first MCPTT client 104a. At step 326, the method includes transitioning by the second MCPTT client 104b from the second broadcast control state to the first broadcast control state after releasing the broadcast call. The method allows the second MCPTT client 104b to transition from the second broadcast control state to the first broadcast control state after releasing the broadcast call.

At step 316, if it is determined that the acknowledgement is required from the second MCPTT user then, at step 328, the method includes initiating the waiting for user timer. The method allows the second MCPTT client 104b to initiate the waiting for user timer. At step 330, the method includes transitioning by the second MCPTT client 104b from the first broadcast control state to a third broadcast control state. The method allows the second MCPTT client 104b to transition from the first broadcast to the third broadcast control state. In an embodiment, the third broadcast control state is a "PENDING USER ACTION" state.

In an embodiment, at step 332, if it is determined that no indication is received from the second MCPTT user then, at step 334, the method includes determining that the waiting for user timer is expired. The method allows the second MCPTT client 104b to determine that the waiting for user timer is expired. At step 336, the method includes transitioning by the second MCPTT client 104b from the third broadcast control state to a fourth broadcast control state. The method allows the second MCPTT client 104b to transition from the third broadcast control state to the fourth broadcast control state. In an embodiment, the fourth broadcast control state is an "IGNORING SAME CALL IDENTIFIER".

At step 338, the method includes receiving the group call broadcast end message including the call identifier IE same as the stored call identifier from the first MCPTT client 104a. The method allows the second MCPTT client 104b to receive the group call broadcast end message including the call identifier IE same as the stored call identifier from the first MCPTT client 104b. At step 340, the method includes transitioning from the fourth broadcast control state to the first broadcast control state. The method allows the second MCPTT client 104b to transition from the fourth broadcast control state to the first broadcast control state.

In an embodiment, at step 332, if it is determined that the accept indication is received from the second MCPTT user then, at step 342, the method includes stopping the waiting for user timer and establishing the media session based on the stored SDP body of the broadcast call. The method allows the second MCPTT client 104b to establish the media session based on the stored SDP body of the broadcast call. At step 344, the method includes transitioning by the second MCPTT client 104b from the third broadcast control state to the second broadcast control state. The method allows the second MCPTT client 104b to transition from the third broadcast control state to the second broadcast control state.

At step 346, the method includes receiving an indication from the second MCPTT user to release the broadcast call with the first MCPTT client 104a. The method allows the second MCPTT client 104b to receive the indication from the second MCPTT user to release the broadcast call with the first MCPTT client 104a. At step 348, the method includes transitioning by the second MCPTT client 104b from the second broadcast control state to the fourth broadcast control state. The method allows the second MCPTT client 104b to transition from the second broadcast control state to the fourth broadcast control state. At step 350, the method receiving the group call broadcast end message including the call identifier IE same as the stored call identifier from the first MCPTT client 104a. The method allows the second MCPTT client 104b to receive the group call broadcast end message including the call identifier IE same as the stored call identifier from the first MCPTT client 104a.

At step 352, the method includes releasing the broadcast call. The method allows the second MCPTT client 104b to release the broadcast call. At step 354, the method includes transitioning by the second MCPTT client 104b from the fourth broadcast control state to the first broadcast control state after releasing the broadcast call. The method allows the second MCPTT client 104b to transition from the fourth broadcast control state to the first broadcast control state after releasing the broadcast call.

In an embodiment, at step 332, if it is determined that the reject indication is received from the second MCPTT user then, at step 356, the method includes terminating the waiting for user timer. The method allows the second MCPTT client 104b to terminate the waiting for user timer. At step 358, the method includes transitioning by the second MCPTT client 104h from the third broadcast control state to the fourth broadcast control state. The method allows the second MCPTT client 104b to transition from the third broadcast control state to the fourth broadcast control state. At step 360, the method includes receiving the group call broadcast end message including the call identifier IE same as the stored call identifier from the first MCPTT client 104a. The method allows the second MCPTT client 104b to receive the group call broadcast end message including the call identifier IE same as the stored call identifier from the first MCPTT client 104a. At step 362, the method includes transitioning by the second MCPTT client 104b from the fourth broadcast control state to the first broadcast control state. The method allows the second MCPTT client 104b to transition from the fourth broadcast control state to the first broadcast control state.

The various actions, acts, blocks, steps, or the like in the flow chart 300 may be performed in the order presented, in a different order or simultaneously. Further, in some embodiments, some of the actions, acts, blocks, steps, or the like may be omitted, added, modified, skipped, or the like without departing from the scope of the invention.

Figure 4A:
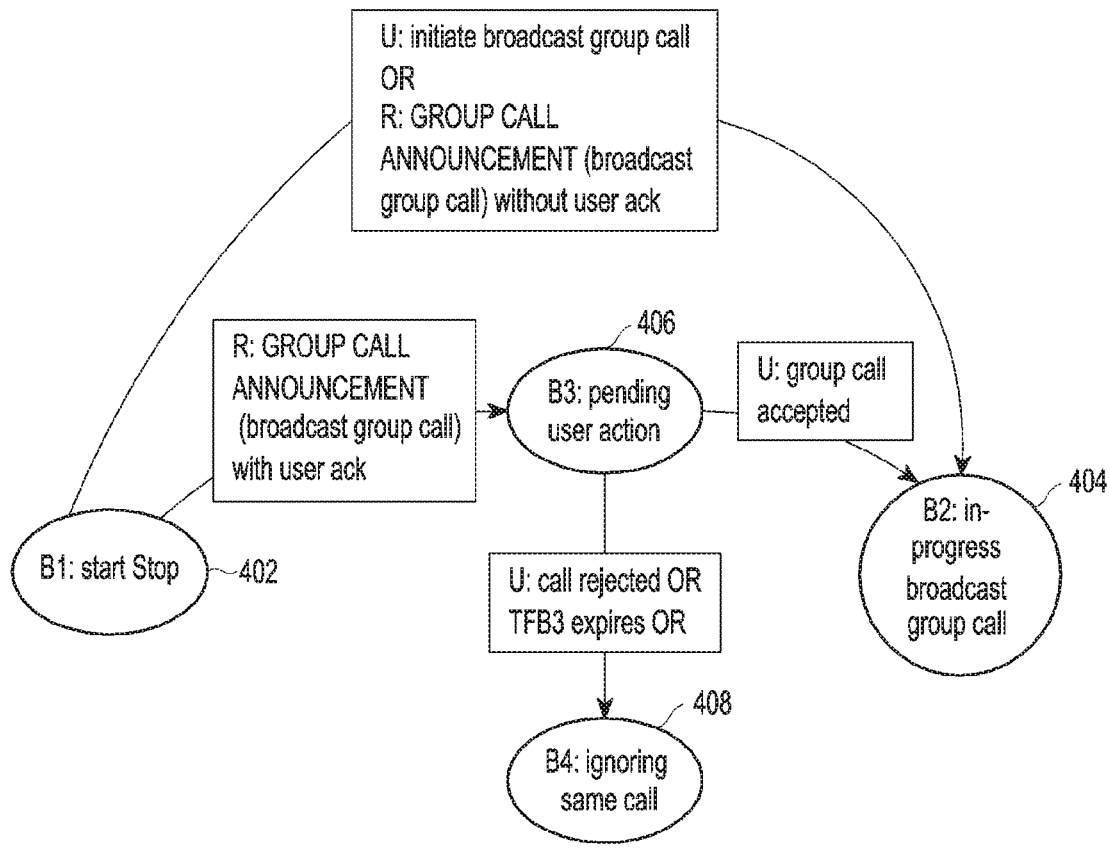
FIGS. 4A-4D are state diagrams of a first UE and a second UE, for managing MCPTT broadcast call in an off-network system, according to an embodiment as disclosed herein.

FIGS. 4A-4D are state diagrams of the first UE 100*a* and the second UE 100*b*, for managing the MCPTT broadcast call in the off-network system, according to an embodiment as disclosed herein. As shown in FIG. 4A, four broadcast control states are involved in the broadcast call. The broadcast control states are described below:

First broadcast control state (i.e., "START-STOP" state) (B1) 402: This state exists for the UE (i.e., the first UE 100*a* and the second LIE 100*b*), when the UE is not part of the ongoing broadcast call.

Second broadcast control state (i.e., "IN-PROGRESS BROADCAST GROUP CALL" state) (B2) 404: This state exists for the UE, when the UE is part of the ongoing broadcast call.

Third broadcast control state (i.e., "PENDING USER ACTION" state) (B3) 406: This state exists for the UE, when the UE has presented a notification to the MCPTT user for the received 'group call broadcast' message, is waiting for a response.

Fourth broadcast control state (i.e., "IGNORING SAME CALL ID" state). (B4) 408: This state exists for the UE, when the broadcast call was rejected or released and the 'group call broadcast' message continue to receive. The various Scenarios for managing the MCPTT broadcast call in the off-network system are described below:

Scenario-1: User initiating the broadcast call

When, in the 'B1: "START-STOP" state 402, upon the indication from the first MCPTT user to initiate the broadcast call, the first MCPTT client 104*a*:

a. Generates the SDP body and stores the generated SDP body as the SDP body of the call, b. Generates the random number with the uniform distribution, for example, between 0 and 65535 and stores the random number as the call identifier of the call, c. Stores the own MCPTT user identifier as the originating MCPTT user identifier of the call, d. Stores the 'broadcast call' as the call type, e. Generates the group call broadcast message. In the group call broadcast message, the first MCPTT client 104*a*:

① Sets the call identifier IE to the stored call identifier of the call,

② Sets the call type IE to the stored call type,

③ Sets the originating MCPTT user identifier IE to the stored originating MCPTT user identifier of the call, ④ Sets the MCPTT group ID IE to the stored MCPTT group ID of the call, and ⑤ Set the SDP IE to the stored SDP body of the call.

f. Sets ProSe Per-Packet Priority to a higher priority, g. Notify the floor participant of the bearer priority (per packet priority), h. Send the group call broadcast message, i. Establish the media session based on the stored SDP body of the call, j. Start the timer "TFB2b" (i.e., broadcast retransmission), and k. Enter (or transition) into the "IN-PROGRESS BROADCAST GROUP CALL" state 404.

Scenario-2: The second UE 104 receiving the group call broadcast message when not participating in the "IN-PROGRESS BROADCAST GROUP CALL" state 404:

In the "START-STOP" state 402, after receiving the group call broadcast message by the second MCPTT client 104*b* with the call identifier IE not matching any in-progress broadcast group call, the second MCPTT client 104*b* can:

a) Store the value of the call identifier IE of the group call broadcast message as the call identifier of the broadcast call, b) Store the value of the call type IE of the group call broadcast message as the received call type, c) Store the value of the SDP IE of the group call broadcast message as the SDP body of the broadcast call, d) Store the value of the originating MCPTT user identifier IE of the group call broadcast message as the originating MCPTT user identifier of the broadcast call, e) Store the value of the MCPTT Group identifier IE of the group call broadcast message as the MCPTT Group identifier of the call, f) If the first UE 100*a* is configured that the first MCPTT user acknowledgement is required upon a terminating call request reception, then the first UE 100*a* can:

① Start (or initiate) the timer "Ty" (i.e., waiting for user timer), and

② Enter (or transition) into the 'PENDING USER ACTION' state 406.

g) If the first UE 100*a* is configured that the first MCPTT user acknowledgement is not required upon the terminating call request reception then, the first UE 100*a* can:

① Establish the media session based on the stored SDP body of the call, and

② Enter into the 'IN-PROGRESS BROADCAST GROUP CALL' state 404.

Scenario-3: Second MCPTT User Accepts the Terminating Call

When in the 'B3: PENDING USER ACTION' state 408, upon indication from the second MCPTT user to accept the incoming broadcast call, the second MCPTT client 104*b* can:

a) Establish the media session based on the stored SDP body of the call, b) Stop the timer TFB3 (waiting for the user), and c) Enter into the 'B2: IN-PROGRESS BROADCAST GROUP CALL' state 404.

Scenario-4: Second MCPTT User Rejects the Broadcast Call

When in the 'B3: PENDING USER ACTION' state 406, upon the indication from the second MCPTT user to reject the incoming broadcast call, the second MCPTT client 104*b* can:

a) Stop the timer "FFB3" (i.e., waiting for user timer);

b) Enter into the 'B4: IGNORING SAME CALL IDENTIFIER' state 408.

Scenario-5: Second MCPTT User does not Act on the Terminating Call

When in the 'B3: PENDING USER ACTION' state 406, upon expiration of the timer "TFB3" (i.e., waiting for user timer), the second MCPTT client 104*b* can:

a) Enter into the 'B4: IGNORING SAME CALL IDENTIFIER' state 408.

Scenario-6: Terminating User Releasing the Call

When in the "B2: IN-PROGRESS BROADCAST GROUP CALL" state 404, upon an indication from the second MCPTT user to release the in-progress broadcast group call, the second MCPTT client 104*b* can:

a) Release the media session, and b) Enter the 'B4: IGNORING SAME CALL ID' state 408.

Scenario-7: First MCPTT User (Originating User) Releasing the Call

When in the 'B2: IN-PROGRESS BROADCAST GROUP CALL' state 404, upon an indication from the originating MCPTT user to release the in-progress broadcast group call, the first MCPTT client 104*a* can:

a) Release the media session;
b) Generate the group call broadcast end message. In the group call broadcast end message, the first MCPTT client 104a can:
① Set the call identifier IE to the stored call identifier of the call;
② Set the originating MCPTT user identifier IE to the stored originating MCPTT user identifier of the call; and
③ Set the MCPTT group identifier IE to the stored MCPTT group identifier of the call;
d) Send the group call broadcast end message;
e) Stop the timer TFB2 (broadcast retransmission);
f) Enter the 'B1: start-stop' state 402.

Scenario-8: Receiving GROUP CALL BROADCAST END Message

Figure 4B:
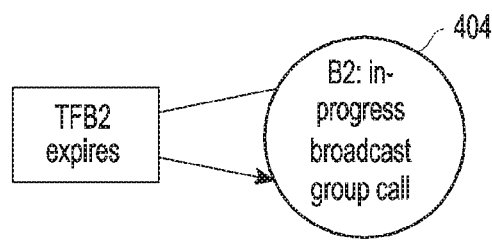
Figure 4C:
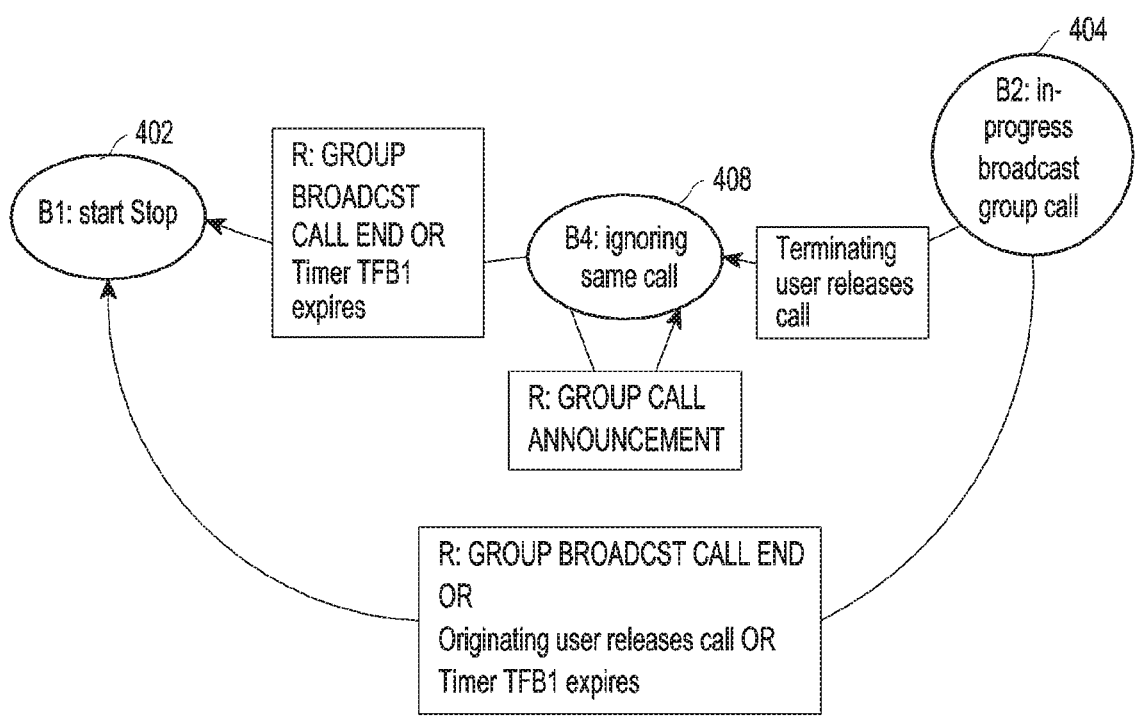

When in the 'B2: IN-PROGRESS BROADCAST GROUP CALL' state 404 or the 'B4: IGNORING SAME CALL IDENTIFIER' state 408 as shown in FIG. 4C, upon receiving the group call broadcast end message with the same call identifier IE as the stored call identifier, the second MCPTT client 104b can:
a) Release the media session; and
b) Enter the 'B1: start-stop' state 402.

Scenario-9: The first UE 102 retransmitting the group call broadcast message: When in the 'B2: IN-PROGRESS BROADCAST GROUP CALL' state 404, upon expiry of the timer "TFB2" (broadcast retransmission) as shown in FIG. 4B, the first MCPTT client 104a can:
a) Generate the group call broadcast message. In the group call broadcast message, the first MCPTT client 104a:
① Sets the call identifier IE to the stored call identifier of the call;
② Sets the call type IE to the stored call type;
③ Sets the originating MCPTT user ID IE to the stored originating MCPTT user ID of the call;
④ Sets the MCPTT group ID IE to the stored MCPTT group ID of the call; and
⑤ Sets the SDP IE to the stored SDP body of the call;
b) Send the GROUP CALL BROADCAST message;
c) Restart timer TFB2 (broadcast retransmission); and
d) Remain in the 'B2: in-progress broadcast group call' state 404.

Scenario-10: When in the "B4: IGNORING SAME CALL ID" state 408, upon receiving the group call broadcast message and if the call identifier in the group call broadcast message matches with the stored call identifier, the second MCPTT client 104b:
a) shall restart timer TFB1 (max duration); and
b) shall remain in "B4: ignoring same call ID" state 408.

Scenario-11: When in the "B2: IN-PROGRESS BROADCAST GROUP CALL" state 404 or "B4: IGNORING SAME CALL ID" state 408, upon expiry of timer TFB1 (max duration), the second MCPTT client 104b:
a) shall release the media session;
b) shall clear the stored call identifier;
c) shall stop floor control, if running; and
d) shall enter the "B1: start-stop" state 402.

Figure 4D:
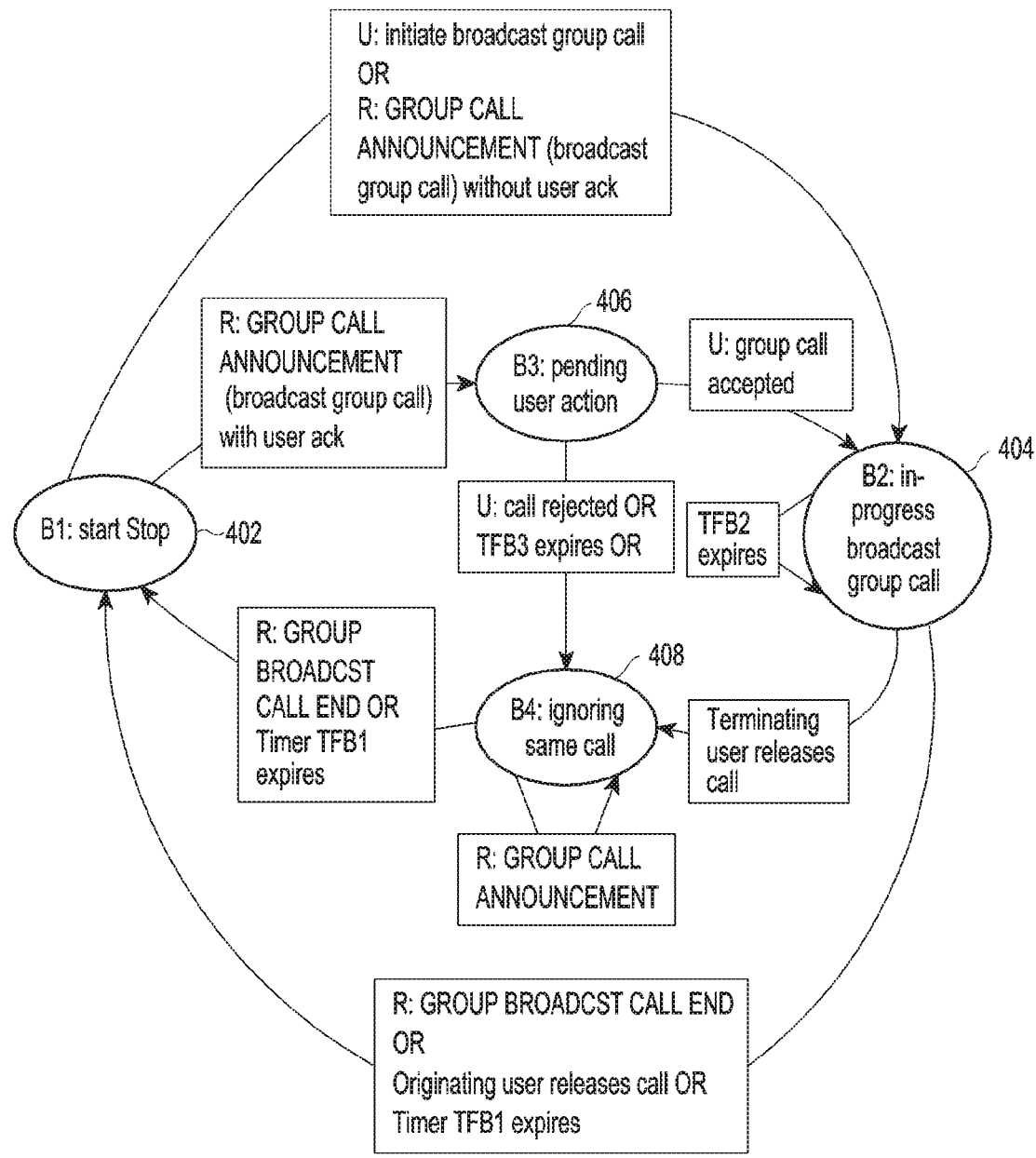

Further, the complete state diagram for the first MCPTT client 104a and the second MCPTT client 104b involved in establishing the broadcast call is shown in FIG. 4D.

Figure 5:
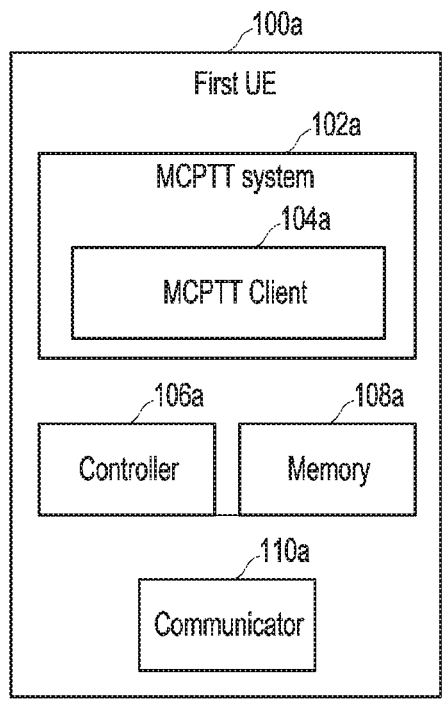
FIG. 5 illustrates various units of a first UE, according to an embodiment as disclosed herein.

FIG. 5 illustrates various units of the first UE 100a, according to an embodiment as disclosed herein. In an embodiment, the first UE 100a includes the first MCPTT system 102a, a controller 106a, a memory 108a, and a communicator 110a. The first MCPTT system 102a includes the first MCPTT client 104a. The functionalities of the first MCPTT client 104a are explained in conjunction with FIGS. 1-4d. Further, the functionalities performed by the first MCPTT client 104a, can also be performed by the controller 106a without departing from the scope of the invention.

The memory 108a may include one or more computer-readable storage media. The memory 108a may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 108a may, in some examples, be considered a non-transitory storage medium. The term "non-transitory" may indicate that the storage medium is not embodied in a carrier wave or a propagated signal. However, the term "non-transitory" should not be interpreted to mean that the memory 108a is non-movable. In some examples, the memory 108a can be configured to store larger amounts of information than the memory. In certain examples, a non-transitory storage medium may store data that can, over time, change (e.g., in Random Access Memory (RAM) or cache). The communicator 110a can be configured for communicating internally between the units and externally with the networks.

FIG. 5 shows exemplary first UE 100a but it is to be understood that other embodiments are not limited thereon. In other embodiments, the first UE 100a may include less or more number of units. Further, the labels or names of the units are used only for illustrative purpose and does not limit the scope of the invention. One or more units can be combined together to perform same or substantially similar function in the first UE 100a.

Figure 6:
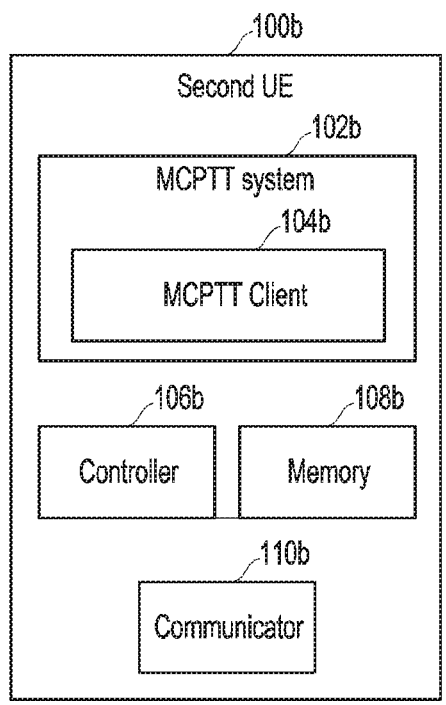
FIG. 6 illustrates various units of a second UE, according to an embodiment as disclosed herein.

FIG. 6 illustrates various units of the second UE 100b, according to an embodiment as disclosed herein. In an embodiment, the second UE 100b includes the second MCPTT system 102b, a controller 106b, a memory 108b, and a communicator 110b. The second MCPTT system 102b includes the second MCPTT client 104b. The functionalities of the second MCPTT client 104b are explained in conjunction with FIGS. 1-4d. Further, the functionalities performed by the second MCPTT client 104b, can also be performed by the controller 106b without departing from the scope of the invention.

The memory 108b may include one or more computer-readable storage media. The memory 108b may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 108b may, in some examples, be considered a non-transitory storage medium. The term "non-transitory" may indicate that the storage medium is not embodied in a carrier wave or a propagated signal. However, the term "non-transitory" should not be interpreted to mean that the memory 108b is non-movable. In some examples, the memory 108b can be configured to store larger amounts of information than the memory. In certain examples, a non-transitory storage medium may store data that can, over time, change (e.g., in Random Access Memory (RAM) or cache). The communicator 110b can be configured for communicating internally between the units and externally with the networks.

FIG. 6 shows exemplary second UE 100b but it is to be understood that other embodiments are not limited thereon. In other embodiments, the second UE 100b may include less or more number of units. Further, the labels or names of the units are used only for illustrative purpose and does not limit the scope of the invention. One or more units can be combined together to perform same or substantially similar function in the second UE 100*b*.

Figure 7:
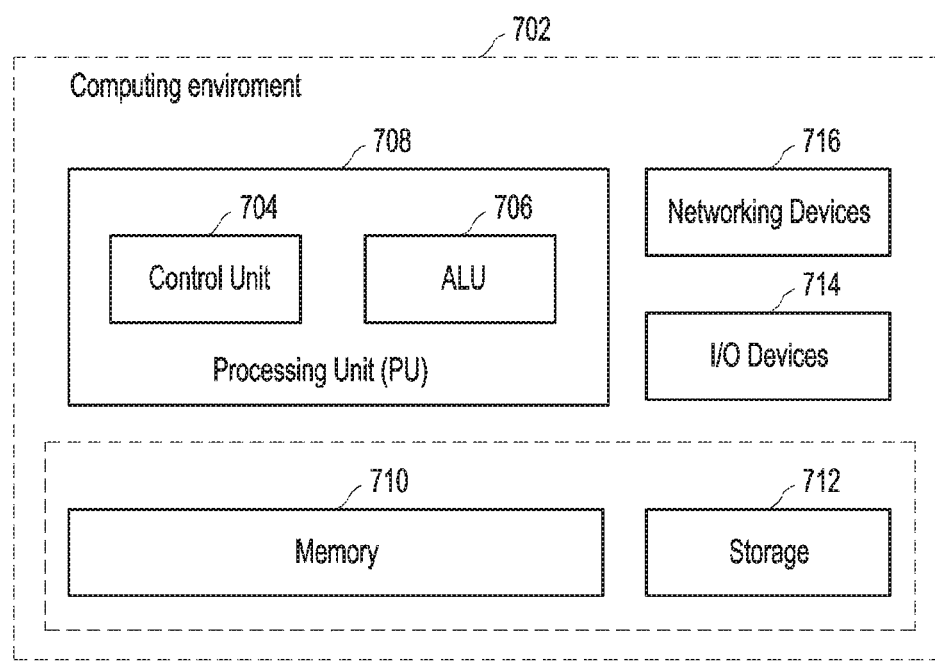
FIG. 7 illustrates a computing environment implementing the MCPTT system and method thereof for managing MCPTT broadcast call in an off-network system, according to an embodiment as disclosed herein.

FIG. 7 illustrates a computing environment 700 implementing the method and system for managing the MCPTT broadcast call in the off-network system, according to an embodiment as disclosed herein. As depicted, the computing environment 702 comprises at least one processing unit 708 that is equipped with a control unit 704 and an Arithmetic Logic Unit (ALU) 706, a memory 710, a storage unit 712, plurality of networking devices 716, and a plurality Input output (I/O) devices 714. The processing unit 708 is responsible for processing the instructions of the schemes. The processing unit 708 receives commands from the control unit 704 in order to perform its processing. Further, any logical and arithmetic operations involved in the execution of the instructions are computed with the help of the ALU 706.

The overall computing environment 702 can be composed of multiple homogeneous or heterogeneous cores, multiple CPUs of different kinds, special media and other accelerators. The processing unit 708 is responsible for processing the instructions of the schemes. Further, the plurality of processing units 708 may be located on a single chip or over multiple chips.

The scheme comprising of instructions and codes required for the implementation are stored in either the memory unit 710 or the storage 712 or both. At the time of execution, the instructions may be fetched from the corresponding memory 710 or storage unit 712, and executed by the processing unit 708.

In case of any hardware implementations various networking devices 716 or external I/O devices 714 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 through 7 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method performed by a first mission critical push to talk (MCPTT) client in an off-network, the method comprising:
   identifying an indication for initiating a broadcast group call;
   setting session description protocol (SDP) information to a body associated with an SDP;
   setting a call identifier to a random number with a uniform distribution;
   setting an originating MCPTT user identifier to a first MCPTT user identifier associated with the first MCPTT client;
   setting a call type to the broadcast group call;
   generating a group call broadcast message including the call identifier, the originating MCPTT user identifier, the call type, and the SDP information;
   setting a proximity service (ProSe) per-packet priority;
   starting a floor control as the first MCPTT client;
   transmitting, to a second MCPTT client, the group call broadcast message;
   establishing a media session with the second MCPTT client, based on the body associated with the SDP;
   starting a broadcast retransmission timer,
   transitioning from a first state associated with a start-stop to a second state associated with an in-progress broadcast group call;
   releasing the broadcast group call as a response to an indication for releasing the in-progress broadcast group call; and
   transitioning from the second state to the first state based on the releasing for the broadcast group call.

2. The method of claim 1, wherein in the group call broadcast message, the first MCPTT client sets a call identifier information element (IE) to the call identifier, sets a call type IE to the call type, sets an originating MCPTT user identifier IE to the originating MCPTT user identifier, sets an MCPTT group identifier IE to an MCPTT group identifier of the broadcast group call, and sets an SDP IE to the SDP information.

3. The method of claim 1, wherein releasing the broadcast group call comprises:
   identifying an indication for releasing the broadcast group call;
   releasing the media session established with the second MCPTT client;
   generating a group call broadcast end message including the call identifier, the originating MCPTT user identifier and an MCPTT group identifier;
   transmitting, to the second MCPTT client, the group call broadcast end message;
   stopping the broadcast retransmission timer;
   stopping the floor control as the first MCPTT client; and
   transitioning from the second state to the first state.

4. The method of claim 3, wherein in the group call broadcast end message, the first MCPTT client sets a call identifier information element (IE) to the call identifier,
   sets an originating MCPTT user identifier IE to the originating MCPTT user identifier, and
   sets an MCPTT group identifier IE to the MCPTT group identifier.

5. A first mission critical push to talk (MCPTT) client in an off-network system, the first MCPTT client configured to:
   identify an indication for initiating a broadcast group call;
   set session description protocol (SDP) information of the call to a body associated with an SDP;
   set a call identifier to a random number with a uniform distribution;
   set an originating MCPTT user identifier to a first MCPTT user identifier associated with the first MCPTT client;
   set a call type to the broadcast group call;
   generate a group call broadcast message including the call identifier, the originating MCPTT user identifier, the call type, and the SDP information;
   set a proximity service (ProSe) per-packet priority;

start a floor control as the first MCPTT client;

transmit, to a second MCPTT client, the group call broadcast message;

establish a media session with the second MCPTT client, based on the bod associated with the SDP;

start a broadcast retransmission timer;

transit from a first state associated with a start-stop a second state associated with an in-progress broadcast group call;

release the broadcast group call as a response to an indication for releasing the in-progress broadcast group call; and transit from the second state to the first state based on the release for the broadcast group call.

6. The first MCPTT client of claim 5, wherein in the group call broadcast message, the first MCPTT client sets a call identifier information element (IE) to the call identifier, sets a call type IE to the call type, sets an originating MCPTT user identifier IE to the originating MCPTT user identifier, sets an MCPTT group identifier IE to the MCPTT group identifier of the broadcast group call, and sets an SDP IE to the SDP information.

7. The first MCPTT client of claim 5, wherein the first MCPTT client is configured to release the broadcast group call by:

identifying an indication for releasing the broadcast group call;

releasing the media session established with the second MCPTT client;

generating a group call broadcast end message;

broadcasting the group call broadcast end message including the call identifier, the originating MCPTT user identifier and an MCPTT group identifier;

transmitting, to the second MCPTT client, the group call broadcast end message;

stopping the broadcast retransmission timer;

stopping the floor control as the first MCPTT client; and transitioning from the second state to the first state.

8. The first MCPTT client of claim 7, wherein in the group call broadcast end message, the first MCPTT client sets a call identifier information element (IE) to the call identifier, sets an originating MCPTT user identifier IE to the originating MCPTT user identifier, and sets an MCPTT group identifier IE to the MCPTT group identifier.

* * * * *